UNITED STATES PATENT OFFICE.

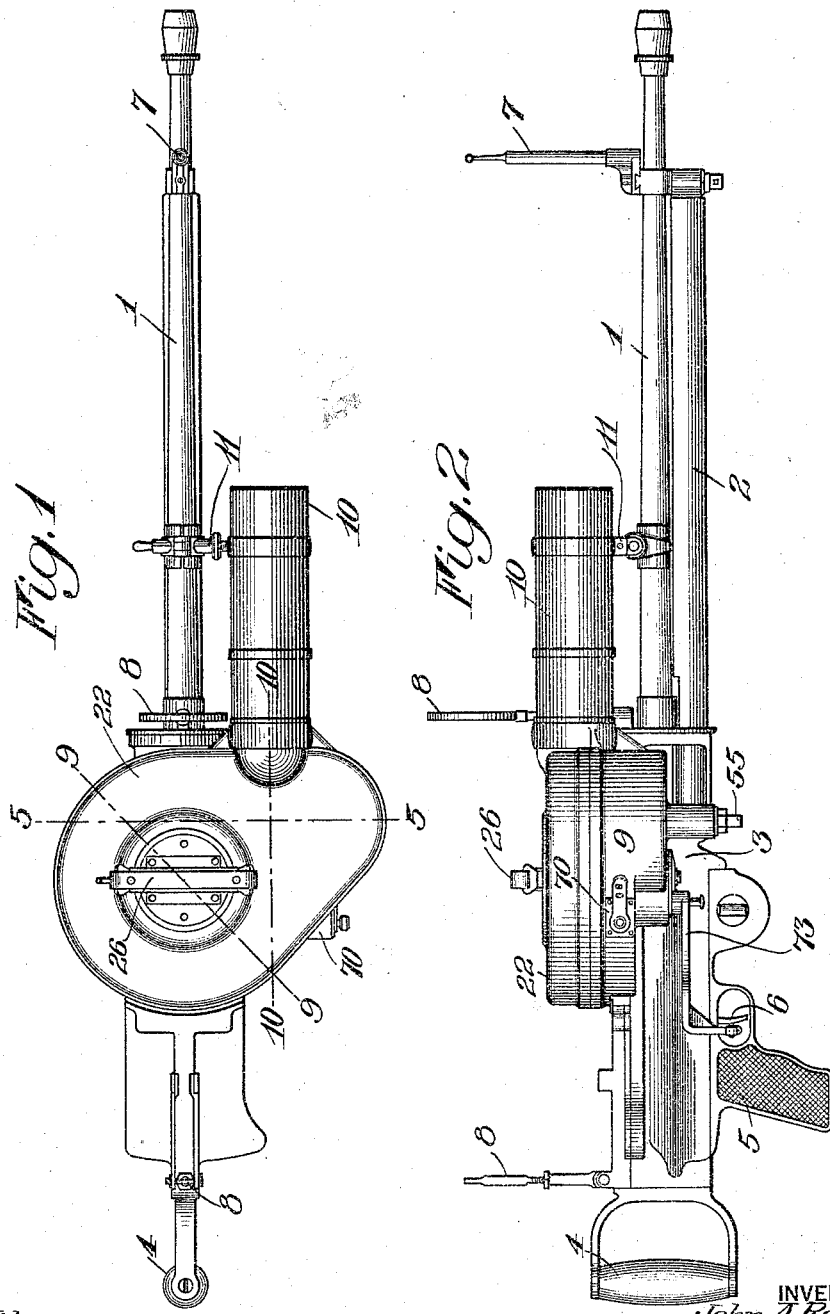

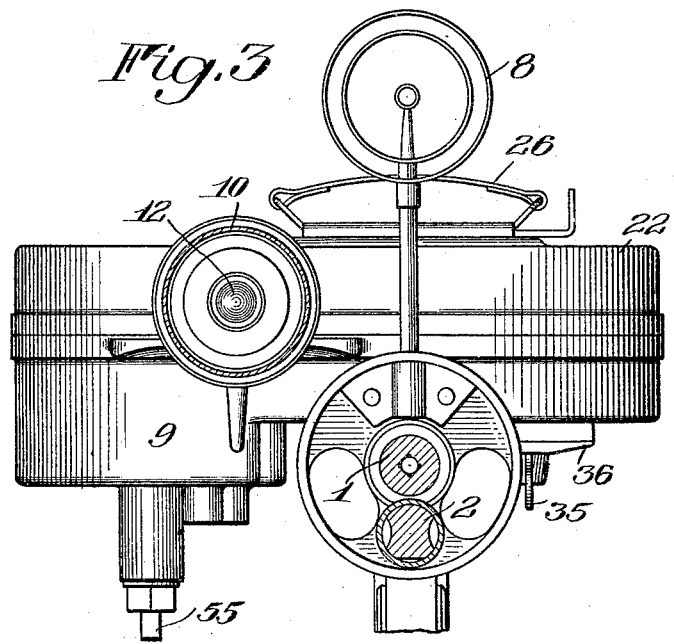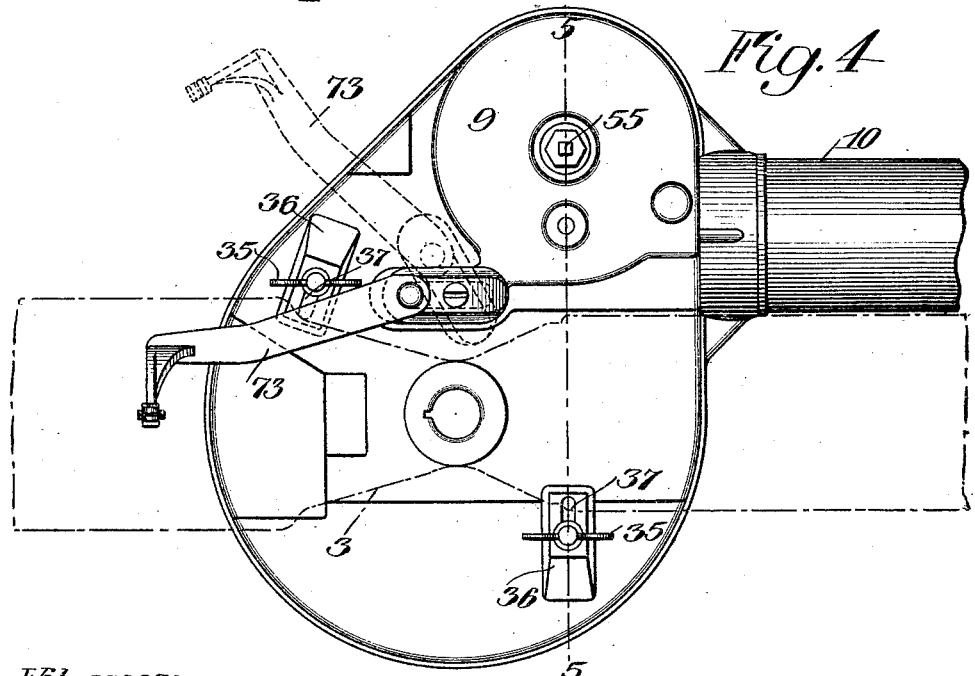

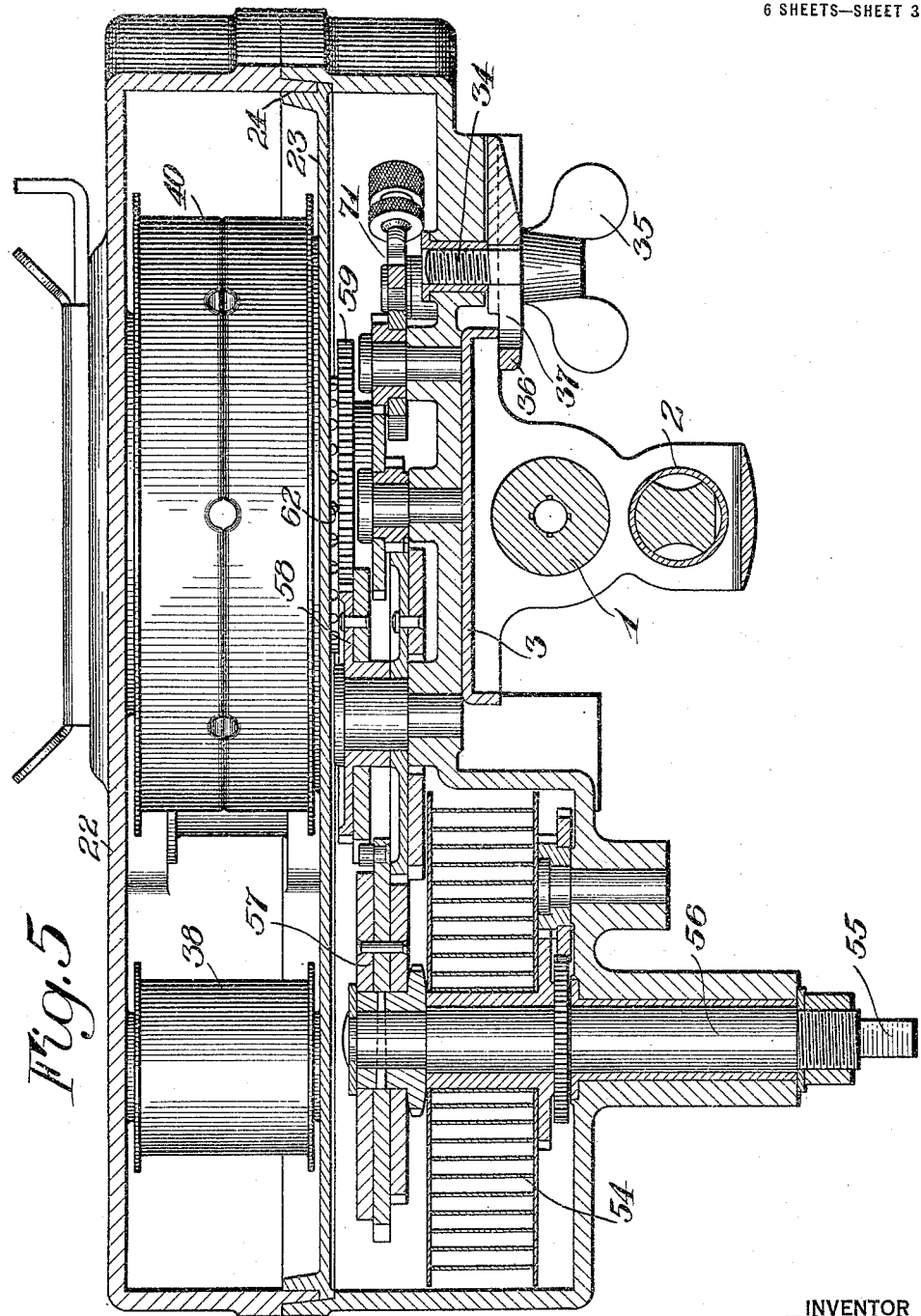

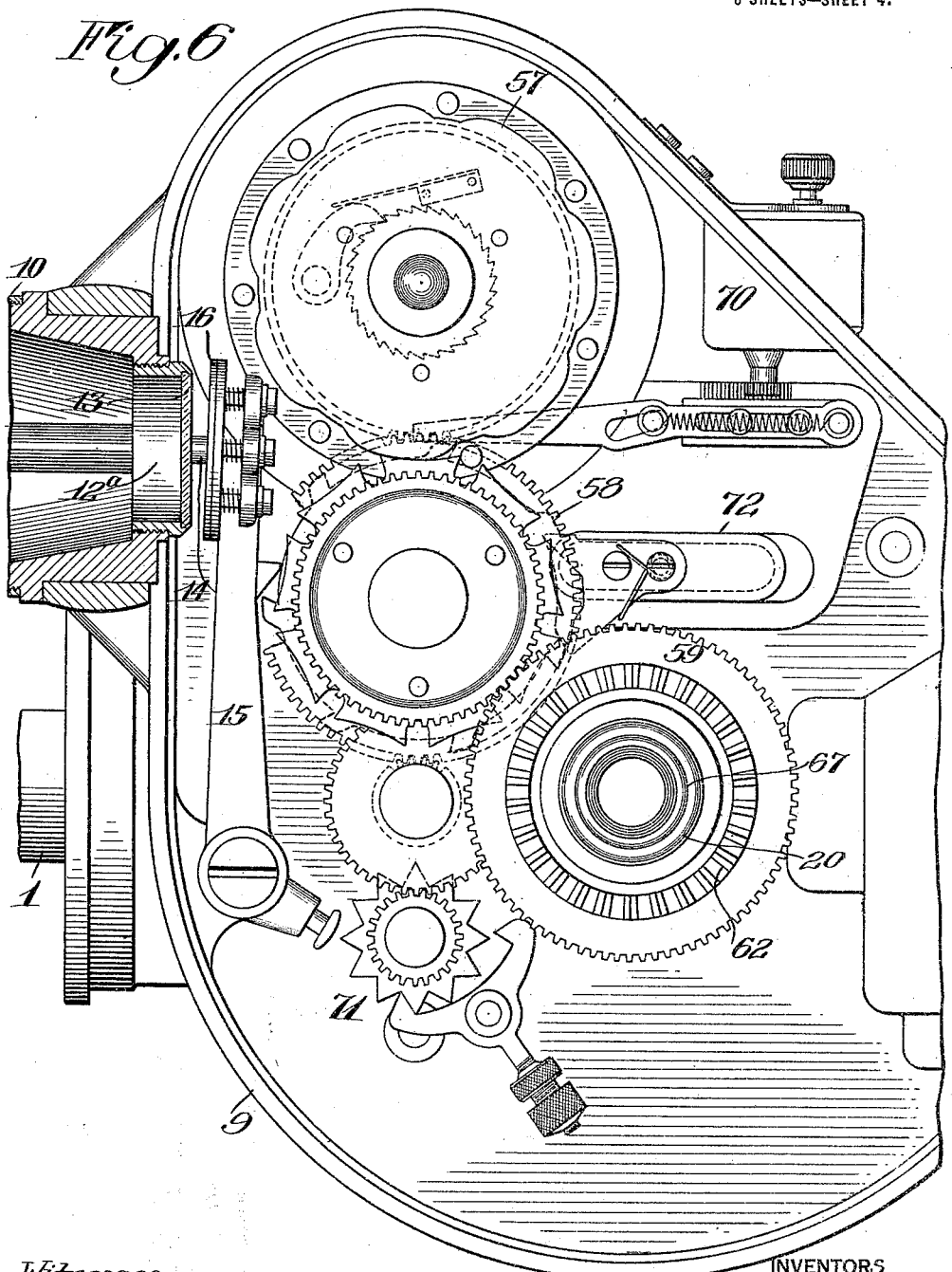

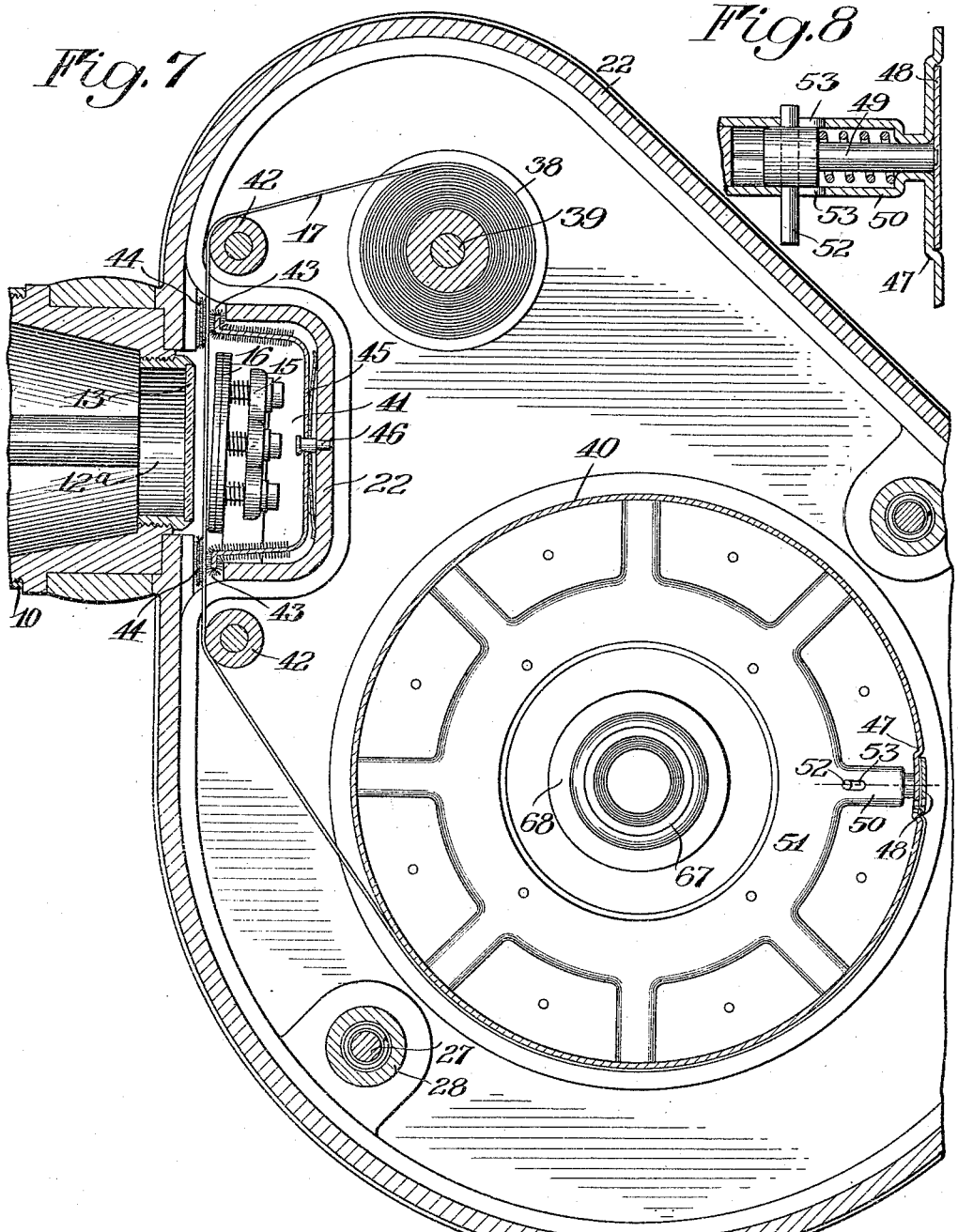

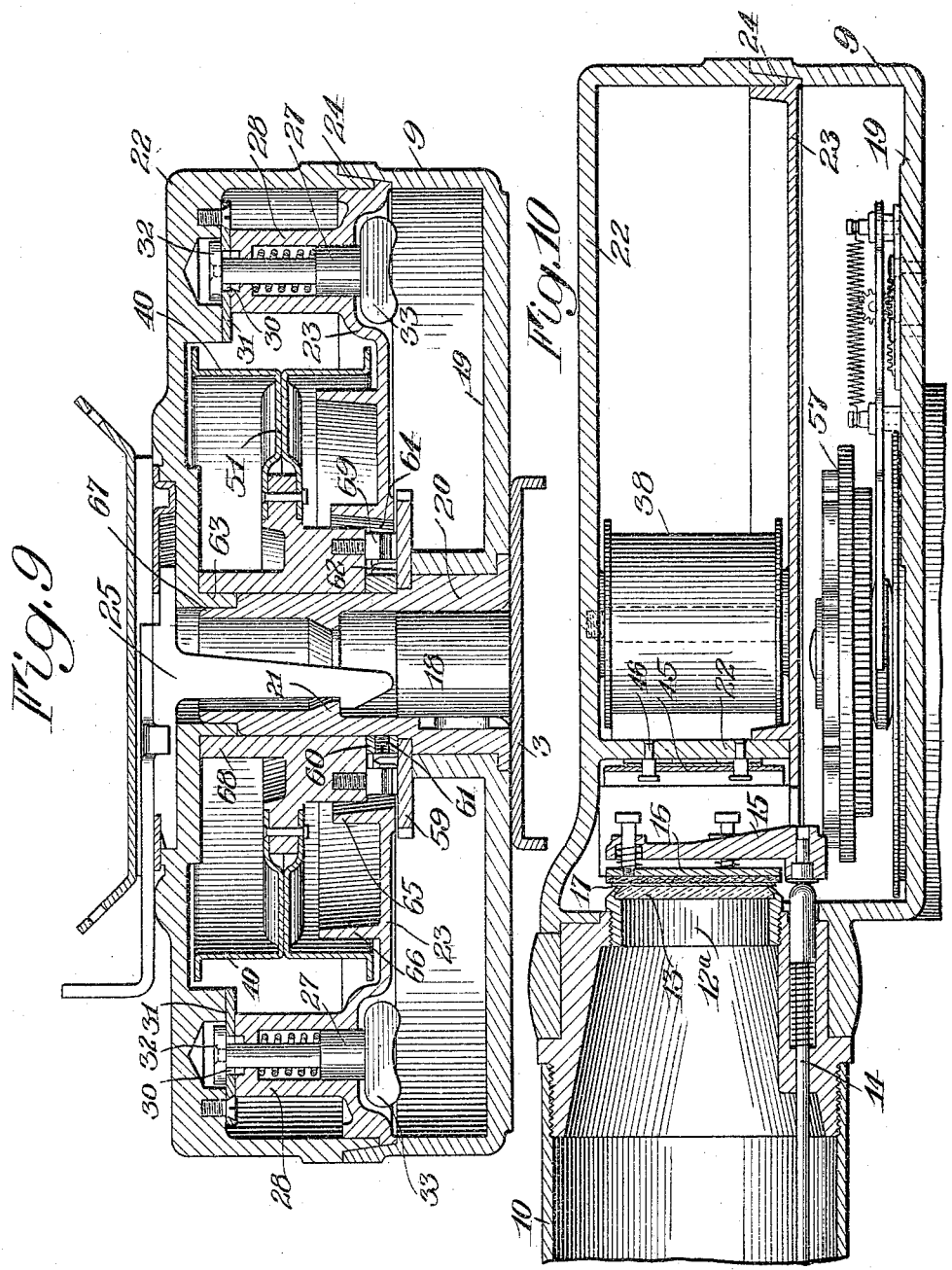

JOHN A. ROBERTSON AND PHILIP W. TIERNEY, OF ROCHESTER, NEW YORK, ASSIGNORS TO EASTMAN KODAK COMPANY, OF ROCHESTER, NEW YORK, A CORPORATION OF NEW YORK.

GUN-CAMERA.

1,360,443.  Specification of Letters Patent.  Patented Nov. 30, 1920.

Application filed June 21, 1918. Serial No. 241,282.

*To all whom it may concern:*

Be it known that we, JOHN A. ROBERTSON and PHILIP W. TIERNEY, of Rochester, in the county of Monroe and State of New York, have invented certain new and useful Improvements in Gun-Cameras; and we do hereby declare the following to be a full, clear, and exact description of the same, reference being had to the accompanying drawings, forming a part of this specification, and to the reference-numerals marked thereon.

Our present invention relates to photography and more particularly to photographic cameras of the type set forth in our prior application, Serial No. 218,483, filed February 21, 1918, whereby the exposing apparatus is applied to and combined with the mechanism of a machine gun for the purpose of training machine gun operators by photographically recording their aim during practice firing without ball ammunition, and the invention has for its object to improve the construction therein shown with particular reference to the manner in which the film is inserted and removed before and after exposure. To these and other ends the invention resides in certain improvements and combinations of parts all as will be hereinafter more fully described, the novel features being pointed out in the claims at the end of the specification.

In the drawings:

Figure 1 is a top plan view of a gun camera constructed in accordance with and illustrating one embodiment of our present invention;

Fig. 2 is a side elevation thereof;

Fig. 3 is an enlarged front view;

Fig. 4 is an enlarged fragmentary bottom plan view;

Fig. 5 is an enlarged transverse section taken substantially on the lines 5—5 of Figs. 1 and 4;

Fig. 6 is an enlarged top plan view, partly in section and partly broken away, of the camera body with the film magazine removed therefrom;

Fig. 7 is a similar view with the magazine applied and in horizontal section through the magazine;

Fig. 8 is an enlarged detail sectional view of a film clamp;

Fig. 9 is a vertical section taken substantially on the line 9—9 of Fig. 1, and

Fig. 10 is an enlarged vertical section taken substantially on the line 10—10 of Fig. 1.

Similar reference numerals throughout the several views indicate the same parts.

As above intimated, one of the principal features of the present apparatus involves the provision of a light-tight roll holder or film magazine that may be quickly applied to or removed from the camera, preferably in a very similar manner to that in which the cartridge magazine of the machine gun is applied and removed so that the student may be supplied with a number of magazines of film and, by using them successively, obtain practice later useful in manipulating cartridge magazines. We have therefore shown the entire apparatus in only a general way and will first describe it very briefly as much of the subject-matter of our prior application referred to is repeated herein.

The camera is applied to a Lewis type machine gun comprising a barrel 1, gas chamber 2, breech frame 3, stock 4, pistol grip 5 and trigger 6 and is aimed by means of the regular front and rear gun sights 7 and 8. The exposing apparatus is so combined with the gun that film is fed in place of cartridges and a single instantaneous pressure on the trigger 6 exposes a single picture area corresponding to the shot of a single cartridge while sustained pressure on the trigger fires a " burst " of long or short duration during which successive picture areas are rapidly exposed.

The camera body includes a partially cylindrical casing 9 in the region of the breech or inner end of the barrel and a tube 10 (Figs. 1, 2 and 3) extending forwardly therefrom parallel with the barrel, the forward end being supported by the latter on a bracket 11. This tube carries the lens 12 and provides the exposure chamber in rear of which is the exposure opening 12$^a$ (Fig. 6) covered by a glass plate 13. A shutter (not shown) at the forward end of the tube in the vicinity of the lens is automatically operated synchronously with the film feed by an actuating rod indicated at 14 in Fig. 10. The actuating rod is operated (Figs. 6 and 10) by an arm 15 carrying a yielding platen 16 that presses the film 17 against the glass 13 of the exposure opening 12 during an exposure, said arm being intermittently operated so that the film is released for feeding between exposures.

Rising from the breech frame 3 of the gun is a magazine post 18 (Fig. 9) and in the practice of our invention, we mount the casing 9 of the camera body upon this post similarly to the mounting of the ammunition magazine that the post is designed to receive. For this purpose there is fixed in the floor 19 of the case 9 a tubular post 20 having an interior annular locking shoulder 21 thereon. The film magazine or roll holder consists of a cover portion 22 and a base portion 23 from which the cover is detachable and these parts come together in a light-tight manner at 24 where they also jointly rest upon the margin of the body casing 9 in a light-tight manner. A sliding latch 25 on the cover portion 22 of the magazine beneath a strap 26 (which latch and strap are like those on the ammunition magazine) coöperates with the locking shoulder 21 on the post 20 and locks the magazine to the camera body and gun, also tending to secure the two portions of the magazine together. This latch is, however, operative for the latter purpose only when the magazine is in place on the camera body. When removed, rotatable and longitudinally movable spring actuated bolts 27 arranged in housings 28 in the body portion 23 of the magazine engage through slots 30 in keeper plates 31 carried by the cover portion 22 and have heads 32 that are turned crosswise of the slots to hold the magazine parts together. The bolts are operated by means of winged finger-pieces 33 that are on the under side of the magazine and hence are concealed within the camera body case 9 when the magazine is in place on the latter. They can therefore not be loosened by accident or by unskilful persons tampering with the apparatus and there is no temptation to remove only the cover of the magazine and fog the film in an attempt to remove the magazine itself.

The camera body case 9 is clamped to the gun by bolts 34 (Figs. 4 and 5) threaded into the bottom 19 thereof and having winged heads 35. Dogs 36 compressed by the bolt heads engage beneath the edges of the breech frame 3 of the gun and the bolts 34 pass through slots 37 in the dog so that the latter may be withdrawn from engagement with the gun to permit the whole photographic apparatus to be removed when desired.

Referring now more particularly to Fig. 7, there is contained within the magazine a feed spool 38 on a spindle 39 and a film winding drum 40 (see also Fig. 5). When the magazine is in place on the body, a depression 41 in the outer forward wall thereof comes opposite exposure aperture 12$^a$ and accommodates the platen 16 on the arm 15. The film 17 is fed over guide rollers 42 through slots 43 in the magazine case from spool 38 to drum 40 and in so doing, spans the depression 41 coming between the glass plate 13 of the exposure opening and the platen 16 and when the magazine is applied to the camera body (the platen being normally retracted), the stretch of film on the exterior of the magazine is presented edgewise between the platen and the exposure opening. Of course, this would be the unsensitized lead end of the film. The openings 43 are made light-tight by light locks 44 of the usual pile fabric one element of each of which may be carried on the flange of a spring yoke 45 secured to the wall of the magazine case 22 at 46 so as to press against the film and create a more positive bar to the light. In threading the film onto the drum 40, its lead end is held in a peripheral depression 47 by a clamping head 48 shown in detail in Fig. 8. The head is carried on a spring pressed stem 49 arranged in a housing 50 in the web 51 of the drum and an operating pin 52 projects through slots 53 in the housing and provides a means for releasing the clamp against the tension of the spring.

The driving mechanism for the film feeding devices is contained within the camera body case 9 and is, in most respects, substantially the same as that employed in the device of our said prior application so we will not describe it in detail herein. Referring more particularly to Figs. 5 and 6, 54 indicates a spring motor wound from beneath the camera body by means of a squared end 55 on its spindle 56. Through intermittent gearing indicated generally at 57 and 58, it turns a gear 59 having a bearing on the tubular post 20 of the camera body (see Fig. 9). This gear is held to its bearing by a locking ring 60 and set screw 61 and on one of its flat or lateral faces it is provided with an annular rack 62 constituting a clutch element. When the magazine 22 is detached from the camera body, the winding drum 40 is temporarily centered on a flanged boss 63 of the cover portion of the magazine. Below the boss on the base portion 23 of the magazine is a circular opening 64 surrounded by an annular flange 65. This flange and a flange 66 radially removed therefrom prevent the drum 40 from disengaging from the boss 63 and when the magazine is applied to the camera body, the tubular post 20 on the latter receives the drum 40 and provides a spindle on which it turns, said post being reduced at 67 to receive the boss 63. The hub 68 of the drum then rests upon the ring 60 surrounding the post and as this hub occupies the greater part of the opening 64, it and the flanges 65 and 66 prevent light from reaching the periphery of the drum within the magazine.

On the lower side of the hub 68 and within the opening 64 are clutch elements 69 which, when the magazine is applied to the camera body, automatically engage with the clutch element 62 on the gear 59 which gear, as before described, is turned by the driving mechanism shown in Fig. 6. In this way, the winding drum is connected up with the motor and its controlling gearing and yet is free to be attached to or removed from the camera body while said drum is in its magazine without further thought as to its driving connection.

As to other elements of the motor mechanism shown, 70 is a counter mechanism (Fig. 6) of obvious construction that receives impulses from the gearing 58; 71 indicates generally an escapement mechanism acting as a governor for the motor, and 72 is a trigger detent slide by means of which the motor gearing is released for each shot. It is connected to an arm 73 beneath the camera body that, when operative, has the full line position of Fig. 4 to coöperate with the gun trigger 6, as shown in Fig. 2, but which may be swung to the dotted line position of Fig. 4 to permit the photographic apparatus to be removed from the gun. These features having nothing to do with the invention claimed herein, do not require detailed description.

We claim as our invention:

1. The combination with a machine gun having an ammunition magazine post extending upwardly from the top thereof, of a camera body mounted on the post and a light-tight film magazine detachably mounted on the camera body.

2. The combination with a machine gun having an ammunition magazine post extending upwardly from the top thereof, of a camera body detachably mounted on the post and a light-tight film magazine detachably mounted on the camera body eccentrically with the post.

3. The combination with a machine gun having a magazine post thereon, of a camera body mounted on the gun and embodying a tubular post engaging over the said magazine post, and a light-tight film magazine detachably mounted on the tubular post.

4. The combination with a machine gun having a magazine post thereon, of a camera body mounted on the gun and embodying a tubular post engaging over the said magazine post, a film magazine detachably mounted on the tubular post, and a film drum in the magazine adapted to turn on the tubular post.

5. The combination with a machine gun having a magazine post thereon, of a camera body mounted on the gun and embodying a tubular post engaging over the said magazine post, a film magazine detachably mounted on the tubular post, a film drum in the magazine adapted to turn on the tubular post and means on the film magazine for centering the film drum when the magazine is detached.

6. The combination with a machine gun having a magazine post thereon, of a camera body mounted on the gun and embodying a tubular post engaging over the said magazine post, a film magazine detachably mounted on the tubular post and embodying a removable cover, a film drum in the magazine adapted to turn on the tubular post and means on the magazine cover for centering the film drum when the magazine is detached.

7. The combination with a camera body having a post thereon, of a superposed light-tight film magazine detachably coöperating with the body and forming a joint therewith at its margin and having an opening in its bottom larger than the post and adapted to be applied over the latter, said magazine having a detachable cover provided with an internal centering projection, and a film drum within the magazine positioned by the centering projection on the cover of the latter and adapted to turn on and relatively to the post.

8. The combination with a camera body having a post thereon, of a superposed light-tight film magazine detachably coöperating with the body and forming a joint therewith at its margin and having an opening in its bottom larger than the post and adapted to be applied over the latter, said magazine being provided with an interior centering projection and a film drum within the magazine positioned by the centering projection and adapted to turn on and relatively to the post.

9. The combination with a camera body, of a film magazine detachably mounted thereon and having a removable cover and a device for securing the latter on the magazine embodying an operating portion housed and concealed within the camera body when the magazine is in place on the latter.

10. The combination with a machine gun having a magazine post thereon, of a camera body mounted on the gun and embodying a tubular post engaged over the said magazine post, a film magazine mounted on the camera body and a sliding latch on the top of the film magazine having a locking engagement with the interior of the tubular post.

11. The combination with a machine gun frame having an ammunition magazine post on the top thereof, of a camera body mounted on the post and a clamping device for said camera body engaging beneath the gun frame.

12. The combination with a camera body having an exposure aperture and containing film feeding mechanism, of a detachable light-tight film magazine coöperating with the body, a film drum carried by the magazine, and clutch elements on the drum and feeding mechanism, respectively, adapted to automatically engage when the magazine is applied to the body.

13. The combination with a camera body having a post thereon and film feeding mechanism within the body embodying a wheel turning on the post and having a clutch element, of a detachable light-tight film magazine coöperating with the body and having an opening to receive the post, a film drum in the magazine adapted to turn on the post and a clutch element on the drum coöperating with that on the wheel.

14. The combination with a camera body having an exposure aperture and a platen in rear thereof, adapted to press an area of film against the aperture and means within the body for operating the platen, of a detachable light-tight film magazine superposed upon and coöperating with the body and having an opening in a wall thereof to receive the platen, said magazine being adapted to position a film strip between the exposure aperture and platen when the magazine is applied to the camera.

15. The combination with a camera body having an exposure aperture and a platen in rear thereof adapted to press an area of film against the aperture and means within the body for operating the platen, of a detachable light-tight film magazine superposed upon and coöperating with the body and having an opening in a wall thereof to receive the platen, said magazine being provided with film openings, and with an exterior recess between the openings to accommodate the platen, light guards for the openings, and film drums within the magazine adapted to feed a film through the openings, said film being slidable edgewise between the platen and camera body when the magazine is applied to the latter.

JOHN A. ROBERTSON.
PHILIP W. TIERNEY.